(12) United States Patent
Phillips et al.

(10) Patent No.: US 6,527,276 B1
(45) Date of Patent: Mar. 4, 2003

(54) SEALING SYSTEM FOR SHAFT-MOUNTED SPEED REDUCERS

(75) Inventors: Allyn E. Phillips, Salem, SC (US); Larry D. Schafer, Greenville, SC (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 09/409,963

(22) Filed: Sep. 30, 1999

(51) Int. Cl.$^7$ ................................................ F16J 15/32
(52) U.S. Cl. ........................ 277/551; 277/351; 277/353; 277/500; 277/549; 277/572
(58) Field of Search .................. 277/351, 353, 277/347, 350, 325, 423, 500, 549, 551, 572

(56) References Cited

U.S. PATENT DOCUMENTS

| | | | |
|---|---|---|---|
| 3,348,430 A | | 10/1967 | Polzin ......................... 74/606 |
| 3,801,111 A | * | 4/1974 | Messenger .................. 277/351 |
| 4,336,945 A | * | 6/1982 | Christiansen et al. ....... 277/351 |
| 4,432,557 A | * | 2/1984 | Drucktenhengst ........... 277/409 |
| 4,550,920 A | * | 11/1985 | Matsushima ................. 277/353 |
| 5,209,499 A | * | 5/1993 | Ruff et al. ................... 277/351 |
| 5,387,040 A | * | 2/1995 | Firstone et al. ............. 277/351 |
| 5,421,591 A | * | 6/1995 | Katzensteiner .............. 277/409 |
| 5,653,448 A | * | 8/1997 | Schlosser .................... 277/353 |
| 5,667,333 A | | 9/1997 | Phillips ....................... 403/369 |

OTHER PUBLICATIONS

"Installation, Lubrication and Maintenance; 107–407TL Screw Conveyor Drives".
Foote–Jones/Illinois Gear; Shaft Mounted and Screw Conveyor Drives.
Dodge Gearing Engineering Catalog.
Falk Drives; "Quadrive 4000J Shaft Mounted Drives with New TA Taper Bushing".
Dodge Bearings.

* cited by examiner

*Primary Examiner*—Anthony Knight
*Assistant Examiner*—Enoch E Peavey
(74) *Attorney, Agent, or Firm*—Patrick S. Yoder; Alexander M. Gerasimow; William R. Walbrun

(57) ABSTRACT

A sealing system for a gear reducer includes a compound sealing arrangement disposed in a bore of the reducer housing through which a rotating member extends. The sealing arrangement includes an outboard shielding seal and a inboard lip seal disposed adjacent to one another. The shielding seal includes an annular metallic shield and forms a labyrinth with the rotating member. An elastomeric sealing member is bonded to the shield. The inboard seal provides at least two additional points of contact for sealing the rotating member. The arrangement defined multiple barriers to liquid and solid contaminants and seals lubricant within the reducer housing. Similar arrangements may be provided about several rotating members, and about ends of members extending through the reducer housing, such as an output hub.

21 Claims, 4 Drawing Sheets

SEALING SYSTEM FOR SHAFT-MOUNTED SPEED REDUCERS

BACKGROUND OF THE INVENTION

1. Field of the Invention

The present invention relates generally to the field of gear reducers and similar products for transmitting mechanical power from a prime mover to a driven load. More particularly, the invention relates to a sealing system for maintaining lubricant in a gear reducer, and for preventing or reducing the ingress of foreign contaminants, including solid and liquid contaminants into the machine from the environment.

2. Description of the Related Art

Gear reducers are employed in a wide variety of applications throughout all facets of industry. In general, gear reducers are employed where a desired speed at an application is reduced with respect to an output speed of a prime mover, such as an electric motor or internal combustion engine. Similarly, speed reducers are used to amplify torque provided by a prime mover. It should be noted, that as used herein, the term "speed reducer" should be understood to include similar machines, whether employed to reduce speeds of a prime mover or, conversely, to increase speeds of a prime mover as may be the case in certain applications.

Gear reducers typically include one or more stages of reduction, depending upon the overall level of reduction desired. For a single reduction stage, the machines may include an input shaft or hub and an output shaft or hub, each carrying gearing which intermeshes to provide a reduction ratio as defined by the gearing configuration. Input shafts in such machines often include a small gear or pinion formed on or mounted to the shaft, while the output shaft or hub typically includes a larger gear wheel supported on the output member. In multi-stage gear reducers, similar intermeshing gear sets are provided for successive reduction in stages, with intermediate stages generally including jack shafts which may be fully enclosed within the gear reducer housing. In machines of this type, the overall gear reduction is a product of the reduction ratio of the successive stages.

Gear reducers have found a wide range of applications in industry. While certain applications are less demanding, many subject the gear reducer to extremely difficult environmental conditions. For example, in mining, material handling, and other applications, gear reducers may be employed to transport various solid and liquid materials, such as via belt conveyors, screw conveyors, augers, and so forth. In these applications, products from the environment, typically liquids, dust and debris can be transmitted to the rotating machinery and ingress into the interior of the gear reducer, or be lodged in the vicinity of the rotating shafts or hubs used to transmit power into and out of the machine. A challenge, then, in such applications continues to be preventing such ingress of foreign contaminant materials so as to protect the bearings and other internal components of the gear reducer.

Another difficulty in applications calling for gear reducers and similar rotating machinery involves the containment of lubricant within the gear reducer housing. To maintain smooth operation of the gear reducer, gear reducer housings are typically filled with a lubricating oil which coats intermeshing and rotating surfaces to maintain smooth operation. Such lubricant is often provided up to a desired level somewhat below the top of the gear reducer internal cavity, such as to a level of an uppermost rotating assembly. The lubricant also provides cooling for the internal components.

Attempts have been made to address the foregoing concerns through the use of various seal arrangements. For example, various types of seal assemblies have been provided at input and output shaft interfaces, both on the gear reducer housing itself, and on various brackets or adapters interfaced with the housing. In the case of shaft-mounted gear reducers, a particular difficulty arises in that the rotating shaft or hub may actually convey contaminants, particularly liquid or semi-liquid contaminants, directly to the seal assembly. Through continuous rotation of the input or output shaft or hub, these materials may progressively ingress into the gear reducer, ultimately resulting in degradation in performance and possible mechanical damage.

There is a need, therefore, for an improved technique for sealing gear reducers, particularly gear reducers designed for mounting to an input or output shaft. There is a particular need for an improved sealing approach which serves both to effectively preclude the ingress of solid and liquid contaminant products from the environment, while maintaining fluid lubricant within the gear reducer housing during operation.

SUMMARY OF THE INVENTION

The invention provides a technique for sealing a gear reducer designed to respond to these needs. The technique may be employed in newly designed products or, in appropriate situations, may be retrofitted into existing machines, replacing lower performance sealing assemblies at one or multiple locations where input or output shafts or hubs traverse housing barriers. The technique provides a multiple-level or compound sealing arrangement which includes a combination of mechanical shields or barriers, and soft seals which ride against a rotating component, typically the input or output shaft or hub. Sealing passages, including labyrinths, and cavities are defined between the sealing components to provide additional barriers to the ingress of foreign contaminants and to the flow of internal lubricants from the gear reducer housing. The entire sealing assembly may be designed to fit flush with an external surface of the housing, or may be recessed, providing a lip or pilot surface for interface adapters, and so forth. External sealing components, such as lip seals or V-seals may be provided to add an additional barrier outboard of the internal and recessed seal assemblies.

In the presently preferred configuration, a first seal assembly is positioned inboard of a second seal assembly. Both seal assemblies are recessed within an aperture to which a rotating component, such as a hub or shaft, extends. The first seal assembly includes a soft seal biased into contact with the rotating member. The second seal assembly includes a metal shield to which a soft seal is secured. Both soft seals ride against the rotating member during operation. Additional contact portions of the seals may be provided, particularly for the first seal assembly, so as to define a plurality of sealing cavities between the contact portions of the seal assemblies. The shield of the second seal assembly fits closely around the rotating member, but does not contact the rotating member. A labyrinth is defined between the shield and the rotating member, eliminating most solid contaminants or debris from contact with the soft seals. An additional face-riding seal may be provided external to the first and second seal assemblies, providing an external barrier to the contaminants.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

Figure 1:
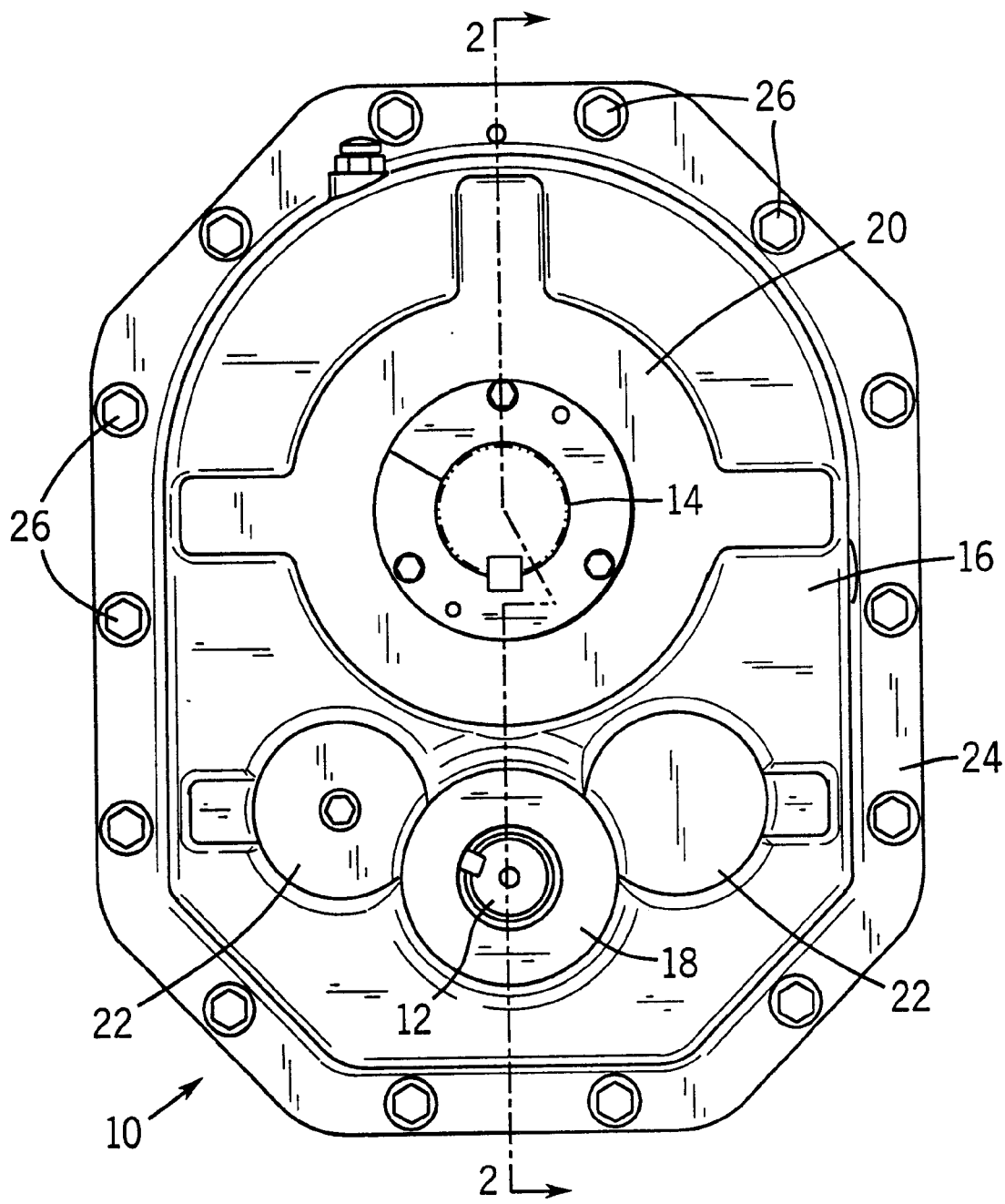
FIG. 1 is an elevational view of a shaft-mounted gear reducer illustrating the external components of the gear reducer housing, including passages for an input shaft and an output hub.

Turning now to the drawings, and referring first to FIG. 1, a shaft-mounted gear reducer 10 is illustrated in an exemplary embodiment as including an input shaft 12 and an output hub 14. The illustrated embodiment of gear reducer 10 is particularly designed to be mounted on an output shaft (not shown) which would be positioned within hub 14 and secured to the hub to mechanically support the gear reducer as an overhung load. In application, the gear reducer is prevented from rotating on the shaft so as to transmit torque to the shaft as input shaft 12 is rotated by a prime mover (not shown), such as an electric motor, internal combustion engine, or other source of mechanical power.

Gear reducer 10 generally includes a housing 16 which supports the input shaft and output hub, as well as additional internal components and gearing as described below. In the illustrated embodiment, an integral input support 18 is formed on housing 16 for providing mechanical support of the input shaft 12. An output support 20 is integrally formed in a similar manner for providing mechanical support of output hub. 14. Additional, intermediate supports 22 may be provided for supporting additional input or output rotating assemblies, but are particularly well suited for supporting internal rotating assemblies, such as intermediate shafts in a multi-stage gear reducer configuration. In the illustrated embodiment, the housing 16 of the gear reducer is formed of two identical casting blanks which are machined to support the rotating assemblies. The housing includes a peripheral flange 24 provided on both front and rear housing shells (see, e.g., FIG. 2), through which fastener sets 26 extend to secure the housing shells to one another and thereby to support the rotating assemblies in a sealed manner.

Figure 2:
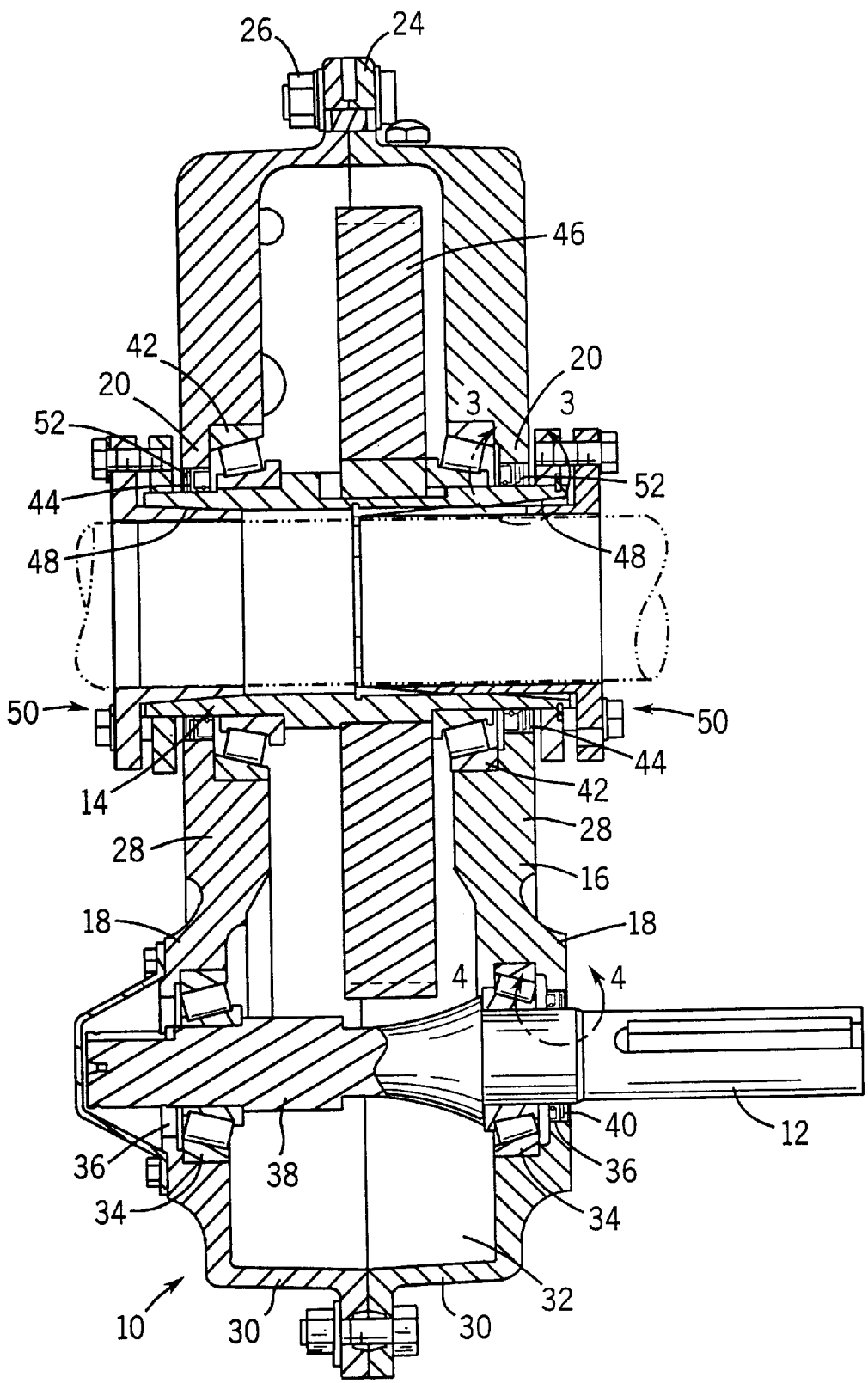
FIG. 2 is a partial sectional view of the gear reducer of FIG. 1, taken along line 2—2, illustrating the internal components of the gear reducer, as well as sealing arrangements for preventing the ingress of external contaminants in accordance with certain aspects of the present technique.

FIG. 2 illustrates certain of the components of the gear reducer 10 of FIG. 1 in partial section. As shown in FIG. 2, each half or shell of housing 16 is formed of a front or rear housing wall 28 contiguous with a peripheral wall 30. Flange 24 is, then, contiguous with peripheral wall 30 to define a sealed inner cavity 32 in which the internal gearing of the reducer is provided. Within cavity 32, bearing sets 34 are positioned within input supports 18 of the housing for receiving and supporting the input shaft 12 in rotation. Input shaft 12 extends from the housing through apertures 36. In the illustrated embodiment, the input shaft is configured as a keyed shaft extension with an integral pinion section 38 for transmitting torque to internal gearing within the reducer.

The pinion section, where appropriate, may be replaced by an input gear or pinion which is separable from the input shaft. An input seal assembly 40 is provided for preventing or reducing the ingress of external contaminants into cavity 32 as described more fully below with reference to FIG. 4. A similar seal assembly may be provided on an opposite end of shaft 12, or the shaft may be covered by a sealed cap as illustrated in FIG. 2.

When placed in operation, shaft 12 will be coupled to a prime mover (not shown), driving it in rotation. It should be noted that shaft 12 may extend from either end of the gear reducer, depending upon the physical constraints of the application. In applications such as belt conveyers, where the reducer may be mounted to a shaft extending through hub 14, input shaft 12 will typically extend on an opposite side of the driven load, permitting the input of mechanical power via axial coupling to a prime mover, or via belts or chains interfacing with sheaves or sprockets secured on the extension of shaft 12. It should also be noted that, in the illustrated embodiment, pinion section 38 of shaft 12 would interface with an intermediate rotating assembly gear, not shown in the Figures for the sake of clarity. Those skilled in the art, however, will appreciate that such an intermediate rotating assembly will provide for first and second stages of speed reduction by interfacing with both the input shaft and gearing on the output hub. The intermediate rotating assembly may be provided at either one of the intermediate support locations designated by reference numerals 22 in FIG. 1.

In the embodiment shown in FIG. 2, additional bearing sets 42 are secured within output supports 20 of the housing for rotationally supporting the output hub 14. The bearing sets surround apertures 44 formed in the housing, permitting output hub 14 to extend through the housing walls for mounting to a mating shaft. Output hub 14, within cavity 32 of the housing, supports a gear 46 which, in operation, would intermesh with a mating gear or pinion of an intermediate rotating assembly (not shown).

Structures are provided in hub 14 for securing the hub to a supporting shaft. In the illustrated embodiment, a tapered bushing arrangement is employed for this purpose. In this arrangement, tapered regions or portions 48 are formed about the inner periphery of hub 14 adjacent to ends thereof. A bushing system, designated generally by reference numeral 50, interfaces with these tapered portions to exert axial and radial loads to the hub and to an output shaft upon installation of the gear reducer thereon. In the illustrated embodiment, the bushing system comprises flanged external tapered bushings which are drawn into tight engagement between the hub and an output shaft, illustrated in broken lines in FIG. 2, via fastener sets. The bushings interface with tapered portions 48 of the hub to exert radial loading as they are axially drawn into tight engagement between the hub and shaft during installation. Within apertures 44 through which the hub extends, sealing assemblies 52 are provided to prevent or reduce the ingress of foreign contaminants into the inner cavity 32 of the gear reducer.

In operation, gear reducer 10 would be installed on an output shaft, such as illustrated in broken lines in FIG. 2. With input shaft 12 driven by a prime mover, output hub 14 would, in turn, be driven at a reduced speed as a function of the gear reduction stages defined by the internal gearing of the reducer. Cavity 32 would be filled, at least partially, with a lubricating fluid, such as mineral oil. As will be appreciated by those skilled in the art, in practice, such lubricant will be provided to a level sufficient to maintain the gearing and bearings in a lubricated state during operation. The lubricant is prevented from escaping from the gear reducer housing via sealing assemblies 40 and 52, as described more fully below.

Figure 3:
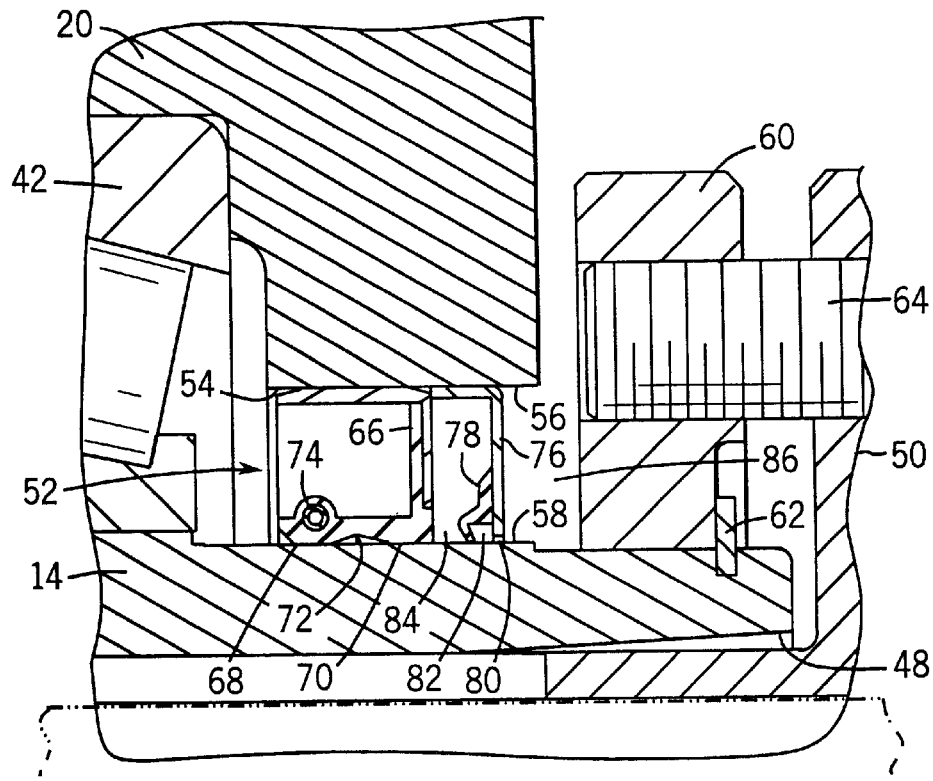
FIG. 3 is a detailed view of the sealing arrangement illustrated in FIG. 2 in the region marked 3—3, showing the components of the multiple-seal assembly structure in accordance with the present technique.

Referring now more particularly to the preferred configuration of the sealing assemblies, FIG. 3 illustrates details of sealing assembly 52 provided about the output hub 14. As shown in FIG. 3, a bore or passage 54 is machined within the output support 20 of the gear reducer housing to define the apertures through which the output hub extends. Bore 54 includes an outer housing surface 56 beyond sealing assembly 52, such that the sealing assembly is slightly recessed within the housing. Where desired, the sealing assembly may extend to the edge of the housing bore, or even slightly beyond the housing edge. In the preferred embodiment illustrated, however, housing surface 56 provided when the sealing assembly is recessed, may serve to receive an extension of a mating component, such as a pilot extension (not shown) of a mechanical adapter.

An external surface of hub 14, opposite bore 56, forms a riding surface 58 against which components of sealing assembly 52 bear to provide multiple points of contact for sealing purposes. In the illustrated embodiment, external components may be secured beyond hub riding surface 58, including a collar 60 and other elements of the bushing system 50 described above. In the illustrated embodiment, these components include a retaining ring 62 shown in FIG. 3 as abutting and retaining collar 60 in place on the hub. A fastener 64 extends into collar 60 to force the bushing system 50 into tight engagement between the hub and an output shaft, as shown in broken lines in FIG. 3.

Sealing assembly 52 includes multiple components providing soft seals which engage riding surface 58 of hub 14, as well as metallic shielding members which protect the soft seals and prevent the ingress of solid contaminants, particles, dust, chips, and so forth. Moreover, labyrinths and cavities are defined by the sealing system components to prevent or reduce the opportunity for such contaminants to migrate inwardly during operation of the gear reducer. In the illustrated embodiment, the sealing system includes a first or inboard seal assembly, and a second or outboard seal assembly fitted adjacent to the inboard seal assembly. Both seal assemblies are positioned within bore 54 and are maintained within bore 54 by a press fit during installation.

As shown in FIG. 3, the first or inboard sealing assembly includes a double lip seal 66 which includes a mechanical support fitted within bore 54, and a soft seal bonded to the mechanical support. The mechanical support may be a metallic structure, to maintain tight press-fit engagement within the bore. The soft seal includes a lip 68 which rides against riding surface 58 of the hub, and a second lip 70 spaced from the first lip by an annular cavity 72. Lip 68 is maintained in tight engagement about riding surface 58 by a biasing member 74, such as an annular spring imbedded within the seal. The first seal assembly is positioned so as to retain lubricant within the gear reducer housing by the sealing of the inboard lip 68 against the outboard hub. In operation, cavity 72 may at least partially fill with lubricant from the inner cavity of the gear reducer, again adding to the sealing effect of the assembly in preventing the ingress of external contaminants.

The outboard sealing assembly as shown in FIG. 3 includes a shield ring 76, preferably formed as an annular metallic support, which is press fitted within bore 54 immediately adjacent to the inboard sealing assembly. A soft seal 78 is bonded to an inner surface of shield 76 and rides against the riding surface 58 of the output hub. The metallic shield 76 of the outboard sealing assembly fits closely about the output hub, spaced from the output hub by a small annular clearance 80. Between the annular clearance or labyrinth 80 and the riding portion of soft seal 78, an additional annular cavity 82 is defined. Moreover, an annular space is defined between the inboard and outboard sealing assemblies, as indicated at reference numeral 84 in FIG. 3.

The sealing assembly 52 illustrated in FIG. 3 and described above thus forms a plurality of barriers preventing the ingress of contaminants into the gear reducer housing, and retaining lubricant within the housing during operation. In particular, sold or semi-solid contaminants which fall or deposit within an exterior region 86 of the sealing assembly are prevented from contacting internal soft seals by shield ring 76. Such contaminants are further prevented from entering into internal spaces of the sealing assembly by the close clearance or labyrinth 80 between this shield ring and the hub. Thereafter, annular cavity 82 may serve to accumulate such contaminants, and may be flushed by lubricant from within the gear reducer, small amounts of which may be carried outwardly past the seals over time. Soft seal 78 prevents or reduces the opportunity for such contaminants to migrate inwardly. An additional chamber defined by annular cavity 84 also serves to accumulate any contaminants which may be permitted past soft seal 78. The multiple points of contact of the inboard seal assembly, including lips 68 and 70, tend to prevent any ingress of semi-liquid or liquid contaminants into the gear reducer. Moreover, as mentioned above, annular cavity 72 may accumulate any such external contaminants, as well as lubricant from within the gear reducer, acting as an effective liquid barrier against the ingress of contaminants past biased lip 68.

The sealing arrangement illustrated above may be provided as an original assembly, where desired, in suitable gear reducers, or may be added to existing products on a retrofit basis, where appropriate surfaces are provided for receiving the seals. Similarly, in the illustrated embodiment, the sealing assembly is provided on both sides of hub 14. Where appropriate, the sealing assembly may be provided on a single side, particularly where the potential for contamination is reduced on one side of the gear reducer. As mentioned above, a similar or adapted sealing system may be provided about additional rotating shafts or hubs which extend from the gear reducer housing. In particular, in the presently preferred embodiment, a sealing assembly of a similar type is provided about input shaft 12.

Figure 4:
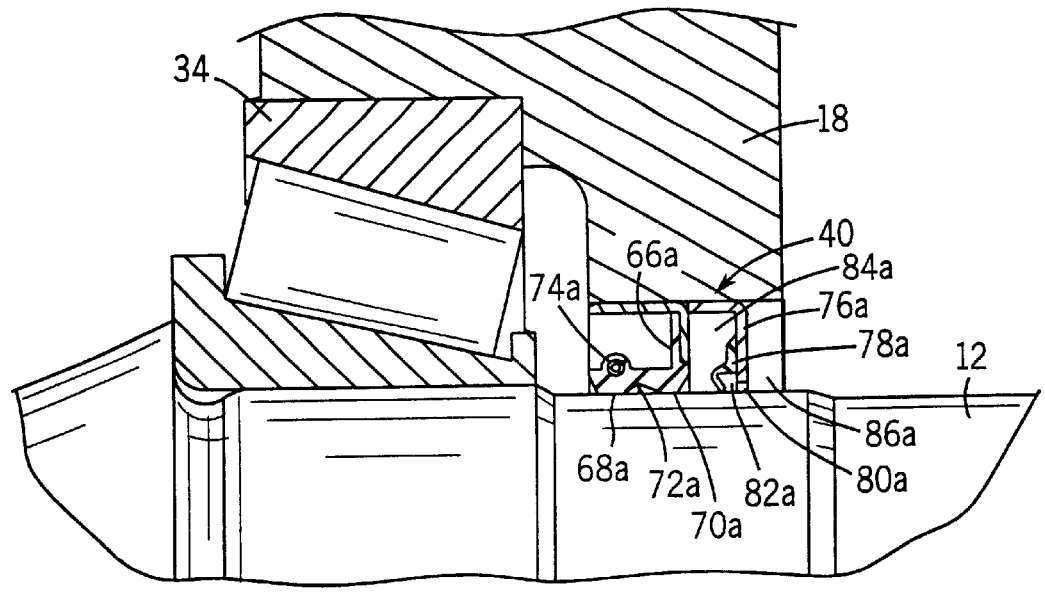
FIG. 4 is a detailed view of the seal assembly illustrated in FIG. 2 in the region indicated 4—4, illustrating an adaptation of the seal assembly for the input shaft.

FIG. 4 illustrates the components of the sealing assembly 40 provided about shaft 12, with reference numerals of parts similar to those described above with reference to FIG. 3 being denoted by the suffix "a." As shown in FIG. 4, shaft 12 extends through the gear reducer housing, and inboard and outboard sealing structures are provided for preventing solid and liquid contaminants from ingressing into the housing during rotation of the shaft. In particular, as described above with respect to FIG. 3, an inboard sealing assembly includes a double lip seal 66a which comprises a biased lip portion 68a and a second lip portion 70a, spaced from one another by an annular cavity 72a. A biasing element 74a, such as an annular spring, is embedded within the lip seal to bias lip 68a into tight engagement about shaft 12. The outboard sealing assembly includes a metallic shield ring 76a to which a soft seal 78a is bonded. The shield ring 76a extends toward shaft 12 to provide a small annular clearance 80a to prevent the ingress of solid or semi-solid contaminants into the sealing assembly. Additional cavities 82a and 84a are defined between the shield ring and the soft seal 78a, and between the inboard and outboard sealing assemblies. The multiple barriers thus provide for retention of lubricant within the gear reducer during operation, and preclude the ingress of both solid and liquid contaminants from the environment.

Figure 5:
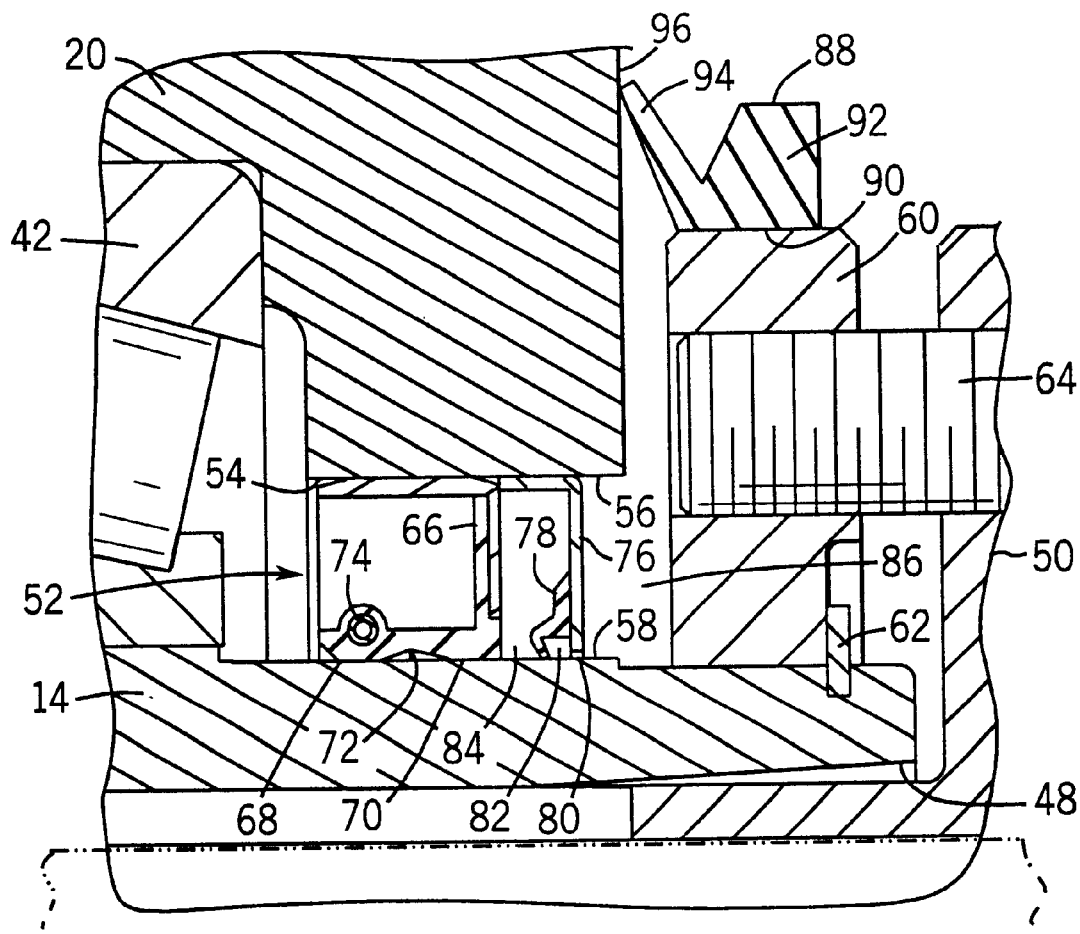
FIG. 5 is a detailed view of a seal assembly of the type illustrated in FIG. 3, to which an additional external seal has been added to provide an external barrier to contaminants.

The various sealing structures described above are subject to adaptation depending upon the particular application, the configuration of the rotating components, and the types of contamination which may be present in the environment. FIG. 5 illustrates one such variant which includes an external seal for limiting the potential for external contaminants to access the region 86 just outboard of the sealing structures described above with reference to FIG. 3. In the embodiment illustrated in FIG. 5, the sealing system includes a V-type seal 88, which may be made of any suitable flexible sealing material, typically synthetic rubber, fitted tightly about an external seating surface 90 of a mechanical component, such as collar 60. Seal 88, as illustrated in FIG. 5, includes a body portion 92 and a lip portion 94 which extends from the body portion and is flexible under the forces applied to it in operation. Extension 94 rides against an outer surface 96 of the gear reducer housing, with seal 88 rotating on collar 60 during operation. Various alternative configurations for seal 88 may be provided, the function of the seal being to preclude or restrict solid and liquid contaminants from accessing region 86 outboard of the sealing assembly described above. Moreover, a backup support or lip (not shown in the Figures) may be provided on the mechanical support, such as collar 60, for providing a positive mechanical seat for seal 88, preventing it from moving away from the gear reducer housing during operation.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A system for sealing a rotating member in a gear reducer, the gear reducer including a housing having a bore through which the rotating member extends, the system comprising:
    a first seal assembly disposed within the bore, the first seal assembly including a support ring fitted to the bore, and a first elastomeric sealing member biased into sealing engagement against the rotating member; and
    a second seal assembly disposed within the bore adjacent to and outboard the first seal assembly, the second seal assembly including a shield member and a second elastomeric sealing member supported on the shield member, the second elastomeric sealing member sealingly engaging the rotating member, the shield member including a metallic ring press fitted to the bore;
    wherein the first and second seal assemblies are separable from one another, and whereby ingress of contaminants into the housing is precluded by the shield member, the second sealing member, an annular space defined between the first and second seal assembly, and the first sealing member.

2. The system of claim 1, wherein the shield member defines a labyrinth about the rotating member precluding ingress of contaminants into the annular space.

3. The system of claim 1, wherein the first sealing member includes at least two points of contact which sealingly engage the rotating member.

4. The system of claim 3, wherein the two points of contact are separated by a second annular space which provides an additional barrier to ingress of contaminants.

5. The system of claim 1, wherein the first sealing member includes an integral biasing member urging the first sealing member into contact with the rotating member.

6. The system of claim 1, wherein the first seal assembly is wetted by lubricant to provide a wet seal about the rotating member.

7. A system for sealing an output hub of a shaft-mounted gear reducer, the hub being rotatably supported in a gear reducer housing, the system comprising:
    an output hub having first and second ends accessible via corresponding first and second bores of the housing, the output hub having first and second sealing surfaces adjacent to the first and second ends; and
    first and second compound sealing assemblies disposed within the first and second bores for sealingly contacting the first and second sealing surfaces, respectively, each compound sealing assembly including an outboard shielding seal press fitted to the bore adjacent to an inboard lip seal to define an outboard contaminant shield and a plurality of riding contact seals spaced from one another by annular contaminant barrier spaces, each shielding seal including an annular metallic shield and an elastomeric sealing member bonded to the shield and contacting the hub, the outboard shielding seal and the inboard lip seal of each compound sealing assembly being separable from one another.

8. The system of claim 7, wherein each shield extends toward the hub to define with the hub a labyrinth precluding ingress of contaminants into the annular space.

9. The system of claim 7, wherein each shielding seal includes a metallic ring press fitted within the respective bore.

10. The system of claim 7, wherein each inboard lip seal includes at least two points of contact which sealingly engage the hub.

11. The system of claim 10, wherein in each of the first and second compound sealing assemblies, a first annular contaminant barrier space is defined between the outboard shielding seal and the inboard lip seal, and a second annular contaminant barrier space is defined between the at least two points of contact of the lip seals.

12. The system of claim 7, wherein each lip seal includes an integral biasing member urging the lip seal into contact with the corresponding sealing surface of the hub.

13. The system of claim 7, wherein the first and second compound sealing assemblies are substantially identical to one another.

14. A system for sealing a gear reducer housing, the system comprising:
    a housing having at least one bore extending between an interior cavity and an outer area;
    a rotating member supported in the housing and extending through the bore and having a sealing surface; and
    a compound sealing assembly disposed within the bore for sealingly contacting the sealing surface, the compound sealing assembly including an outboard shielding seal press fitted to the bore adjacent to an inboard lip seal to define an outboard contaminant shield and a plurality of contact points riding against the sealing surface spaced from one another by annular contaminant barrier spaces, the shielding seal including an annular metallic shield and an elastomeric sealing member bonded to the shield and contacting the rotating member, the outboard shielding seal and the inboard lip seal being separable from one another.

15. The system of claim 14, wherein the housing includes first and second bores, the rotating member extends through the first and second bores, and a compound sealing assembly is disposed in each of the first and second bores to seal corresponding first and second sealing surfaces of the rotating member.

16. The system of claim 14, wherein the rotating member includes an output bore supporting gearing within the housing and configured to receive a support shaft.

17. The system of claim 14, wherein the shield extends toward the rotating member to define with the rotating member a labyrinth precluding ingress of contaminants into the annular space.

18. The system of claim 14, wherein the shielding seal includes a metallic ring press fitted within the bore.

19. The system of claim 14, wherein the inboard lip seal includes at least two points of contact which sealingly engage the rotating member.

20. The system of claim 19, wherein a first annular contaminant barrier space is defined between the outboard shielding seal and the inboard lip seal, and a second annular contaminant barrier space is defined between the at least two points of contact of the lip seals.

21. The system of claim 14, wherein the lip seal includes an integral biasing member urging the lip seal into contact with the sealing surface of the rotating member.

* * * * *